(12) United States Patent  
Van Schyndel et al.

(10) Patent No.: US 9,024,738 B2
(45) Date of Patent: May 5, 2015

(54) APPARATUS, SYSTEMS AND METHODS FOR MITIGATING VIBRATION OF AN ELECTRONIC DEVICE

(71) Applicant: Blackberry Limited, Waterloo (CA)

(72) Inventors: Andre John Van Schyndel, Kanata (CA); Per Magnus Fredrik Hansson, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/757,152

(22) Filed: Feb. 1, 2013

(65) Prior Publication Data

US 2014/0218183 A1    Aug. 7, 2014

(51) Int. Cl.
*H04B 3/36* (2006.01)
*G06F 3/01* (2006.01)
*H02N 2/00* (2006.01)

(52) U.S. Cl.
CPC . *G06F 3/016* (2013.01); *H02N 2/00* (2013.01)

(58) Field of Classification Search
CPC ........ G08B 6/00; A01M 1/023; A01M 1/223; A01M 2200/012; B06B 1/08; G06F 3/016; G11B 33/06; H01L 41/12; H02N 2/00
USPC ............. 340/407.1, 6.1, 7.2, 7.58, 7.6, 407.2, 340/815.83, 392.1
See application file for complete search history.

(56) References Cited

U.S. PATENT DOCUMENTS

| 6,801,864 | B2 * | 10/2004 | Miller .............................. 702/56 |
| 7,596,795 | B2 | 9/2009 | Ding et al. |
| 8,000,839 | B2 | 8/2011 | Urmanov et al. |
| 8,167,826 | B2 * | 5/2012 | Oohashi et al. ................... 601/2 |
| 8,188,981 | B2 * | 5/2012 | Shahoian et al. ............. 345/173 |
| 2005/0275508 | A1 | 12/2005 | Orr et al. |
| 2009/0189748 | A1 * | 7/2009 | Bergere ..................... 340/407.1 |
| 2009/0316916 | A1 * | 12/2009 | Haila et al. ....................... 381/57 |
| 2011/0273378 | A1 | 11/2011 | Alameh et al. |
| 2012/0286943 | A1 * | 11/2012 | Rothkopf et al. .......... 340/407.1 |

FOREIGN PATENT DOCUMENTS

WO    2006092746    9/2006

OTHER PUBLICATIONS

European Patent Office, Extended European Search Report, for European Patent Application Serial No. 13153733.4 mailed Jun. 18, 2013.

* cited by examiner

*Primary Examiner* — Daniel Previl
(74) *Attorney, Agent, or Firm* — Perry + Currier, Inc.

(57) ABSTRACT

According to one aspect, an electronic device that includes a vibrating element adapted to vibrate the electronic device, at least one sensor operable to detect the presence of an audible higher-order harmonic above a fundamental frequency when the vibrating element is active. The device also includes a processor operable to adjust the vibrating element to reduce the audible higher-order harmonic when the audible higher-order harmonic is detected.

20 Claims, 7 Drawing Sheets

APPARATUS, SYSTEMS AND METHODS FOR MITIGATING VIBRATION OF AN ELECTRONIC DEVICE

FIELD

Embodiments herein relate to electronic devices and in particular to apparatus, systems and methods for mitigating vibration of an electronic device, particularly undesired bouncing caused by a vibrating element when the electronic device is resting on a surface.

INTRODUCTION

Electronic devices, including portable electronic devices like smart phones, have gained widespread use and may provide a variety of functions including telephonic services, text messaging, playing media such as music and movies, and so on.

In some cases, electronic devices may be adapted to vibrate in response to a specific event. For example, an electronic device may include a vibrating element (e.g., a vibrator) that is operable to vibrate the electronic device when a new message or telephone call is received. Vibration may also serve to alert a user of a calendar event, that a battery is low and needs recharging, and so on.

DRAWINGS

For a better understanding of the embodiments described herein, and to show how they may be carried into effect, reference will now be made, by way of example, to the accompanying drawings.

DESCRIPTION OF VARIOUS EMBODIMENTS

Generally, some embodiments as described herein may be implemented on electronic devices, which may include a wide range of portable electronic devices that can be readily transported from place to place.

Some portable electronic devices may be handheld, that is, sized and shaped to be held and carried in as human hand, and used while held or carried. Examples of handheld portable electronic devices may include, but are not limited to, mobile phones, smart phones, personal digital assistants (PDAs), notebook computers, laptop computers, digital audio/video players, digital audio/video recorders, navigation devices (such as global positioning system (GPS) navigators), remote controls, tablet computers, and so on.

On some electronic devices, computer resources (e.g., memory capacity, processing power, screen space, and power) may be more limited than on other devices. A smart phone, for example, may have a smaller display and less memory capacity than a laptop computer.

In some embodiments, the electronic device may be a smart phone with communications capabilities (e.g., voice, data, or both) over a data connection (e.g., a cellular network) that is adapted to cooperate with an accessory (e.g., headphones).

In general, electronic devices may be adapted to vibrate to generate a user alert about particular events. In general, an element that is adapted to perform a function is suitable for performing the function, or is configured to perform the function, or is operable to perform the function, or is otherwise capable of performing the function. For example, an electronic device may include a vibrator that vibrates the electronic device (or is adapted to vibrate all or part of the electronic device) in response to certain events, such as when a new electronic message is received, when a telephone call is received, when a battery is low, or at various other times.

In some cases, these vibrating alerts may be accompanied by other alerts, such as an audible alert (e.g., a beep or musical tone) or a visual alert (e.g., a flashing LED, a message on a display screen, etc.). Sometimes, the vibrating alert may be the only alert triggered for a particular event, particularly when a user would like to remain discreet, although in other cases more than one alert may be generated.

In many cases, a user may be able to customize vibrating alerts for particular events or device configurations. Such customization may include adjusting the intensity or duration of vibration, or both. For example, a user may desire a vibrating alert with a low intensity and short duration when an electronic message is received, but a vibrating alert with a long duration and high intensity when a telephone call is received.

In some embodiments, an electronic device may have different device configurations, such as a "loud" configuration, when the volume of audible alerts and the intensity of vibrating alerts are elevated, and a "quiet" configuration, when audible alerts are suppressed and the intensity of vibrating alerts is reduced. In some cases these configurations may be preset, and a user may be able to switch between configurations as desired. In some cases, the user may be able to modify preset configurations, add new configurations, and so on.

In general, the vibration of the electronic device should be selected at a sufficiently high level such that it will be readily perceived by the user, either audibly (so that the user hears the vibration) or in a tactile manner (where the user may feel the vibration). Otherwise the alert may go unnoticed by the user and thus may not be an effective alert.

In some cases, the intensity of the vibrating alert may need to be quite high in order for it to be perceived by a user, particularly when the electronic device is being used in a noisy environment, or the electronic device is being carried in a holster or in a user's purse or bag, for example.

Unfortunately, when the electronic device is in contact with a surface (e.g., resting on a table), vibrating alerts can cause unwanted noise or movement (or both) of the electronic device. In particular, the vibrating alert can cause the electronic device to "bounce" on a surface, such as a desk or a table. This bouncing can be quite noisy, particularly when the intensity of the vibrating alert is high, resulting in an audible noise (or "buzzing") can be quite distracting, unpleasant and generally undesirable to a user.

As used herein, terms such as "undesired effect" and "undesirable vibration effect" are not strictly dependent upon personal likes or dislikes of the user. Rather, they are directed to objective behavior or consequences that may be caused by vibration. The vibration may be wasteful of resources (such as power), for example, or may cause damage to the electronic device, or at least increase the risk of damage to the electronic device, or may otherwise increase a risk of harm to a person, to the device, or to something else.

In some cases, for example, the bouncing may cause the electronic device to move laterally about a surface. This is undesirable, and in some cases this lateral movement might actually result in the electronic device falling off an edge of the surface (e.g., the edge of a table), which could result in damage to the electronic device if the device were to fall and strike a hard floor surface, for example.

Thus, while vibrating alerts may be desirable, they can result in unwanted noise and movement of the electronic device when the device is resting on a surface.

According to some embodiments, one or more sensors on an electronic device (e.g., a microphone, accelerometer, etc.) may be used to determine when an electronic device is experiencing undesirable vibration effects caused by a vibrating alert. This information can then be used to adjust the vibrating element (e.g., the intensity or duration of a vibrator) to inhibit undesirable vibration effects. In some embodiments, the sensor is provided as a component of the electronic device (i.e. is a portion of the electronic device).

In some embodiments, one or more sensors will detect the presence of one or more audible higher-order harmonics (e.g., harmonics above a fundamental frequency). In general, the observed audio signal will change (in some cases quite dramatically) when bouncing occurs, and one or more higher-order harmonics may be generated by reflections of the surface in contact with the electronic device.

In some embodiments, when second and other higher-order harmonics having particular properties (e.g., an amplitude above a particular threshold) are detected, this indicates that the electronic device is experiencing undesirable vibration effects (e.g., unwanted noise or "buzzing", which may be accompanied by undesirable movement of the electronic device about the surface). In such cases, the vibration intensity can be automatically reduced to suppress, lessen or even eliminate this unwanted vibration effects.

For instance, the vibrating element may be a motor, and the rotational speed of the motor and hence the fundamental frequency of oscillation of the electronic device (also called the fundamental or first harmonic) may be known.

In some particular embodiments the motor may rotate to cause vibration at a fundamental harmonic of around 150 Hz. When a higher-order harmonic, such as a second harmonic, is detected (e.g., a signal at 300 Hz) with a magnitude that exceeds a particular amplitude, the rotational speed of the motor could be automatically decreased to inhibit bouncing or other undesirable vibration effects.

Adjusting the rotational speed of the motor may affect the frequency of the vibrating element or the intensity of the vibration (or both), and may also cause the higher-order harmonic to diminish, disappear or otherwise be reduced.

By automatically adjusting the vibration to suppress unwanted vibration effects, the intensity of the vibration for the electronic device may be selected to be at a sufficiently high level to ensure its effectiveness as a vibrating alert (e.g., the alert will be noticed by a user), while allowing undesired noise (e.g., buzzing) and movement of the electronic device to be suppressed.

Generally speaking, the bouncing of an electronic device is a non-linear process that will change the output waveform of a sensor, such as an accelerometer or microphone, particularly the harmonic content. The bouncing response will normally depend on the elasticity of the surface in contact with the electronic device.

For instance, an electronic device placed onto a soft rubber pad or a pillow may experience very little to no bouncing due to damping effects within the rubber pad or pillow, and thus have very little or no undesirable audio effects or movement caused by the vibration of the electronic device.

On the other hand, an electronic device placed onto a hard stone counter or wood table with little or no damping effects may experience very significant bouncing, resulting in loud undesirable audio effects and unwanted movement of the electronic device. In general, the teachings herein can be used to automatically suppress these unwanted effects, and provide for an improved user experience.

Figure 1:
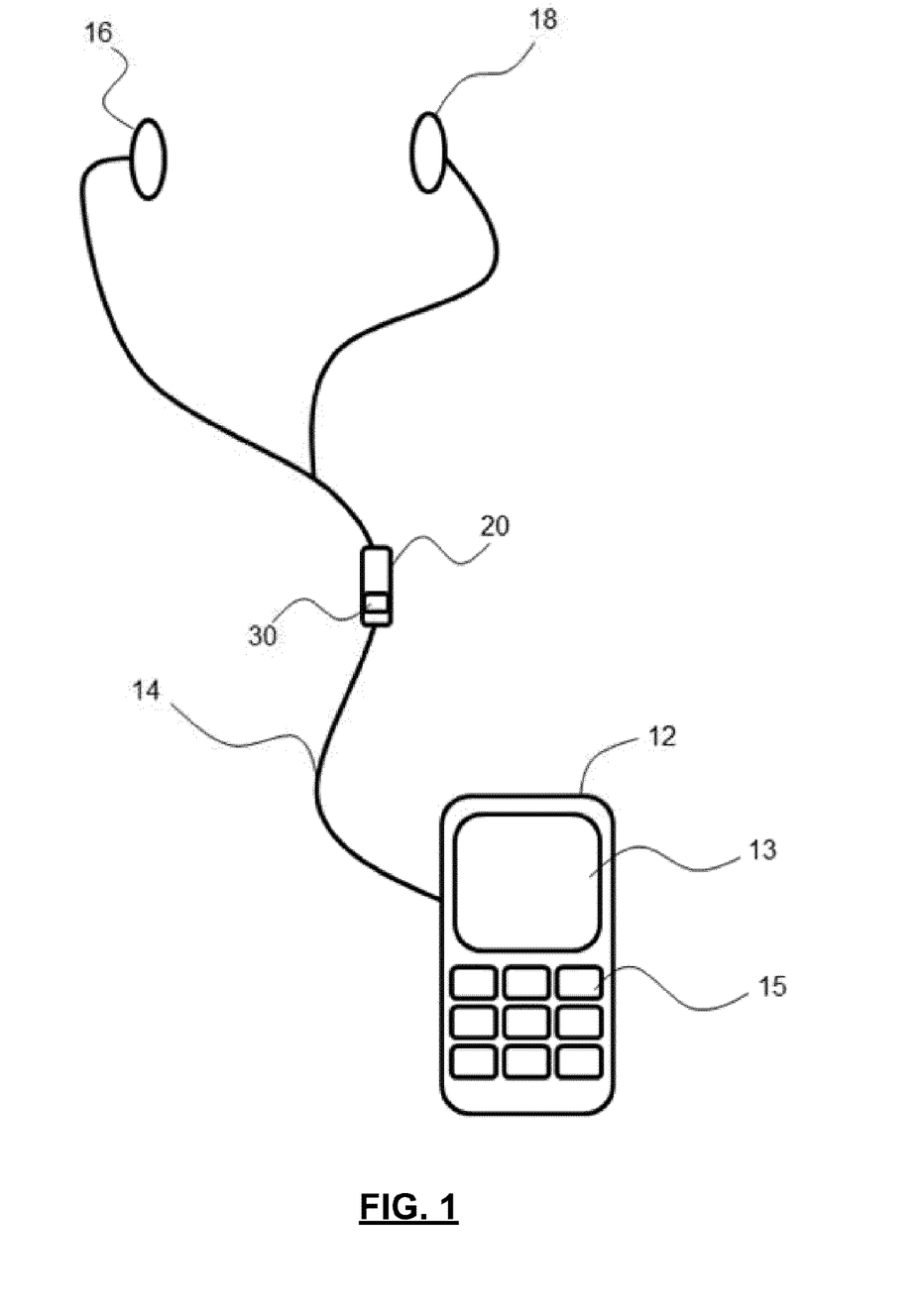
FIG. 1 is a schematic representation of an electronic device according to one embodiment.

Reference is now made to FIG. 1, which is a schematic diagram illustrating an electronic device 12 according to one embodiment.

Figure 2:
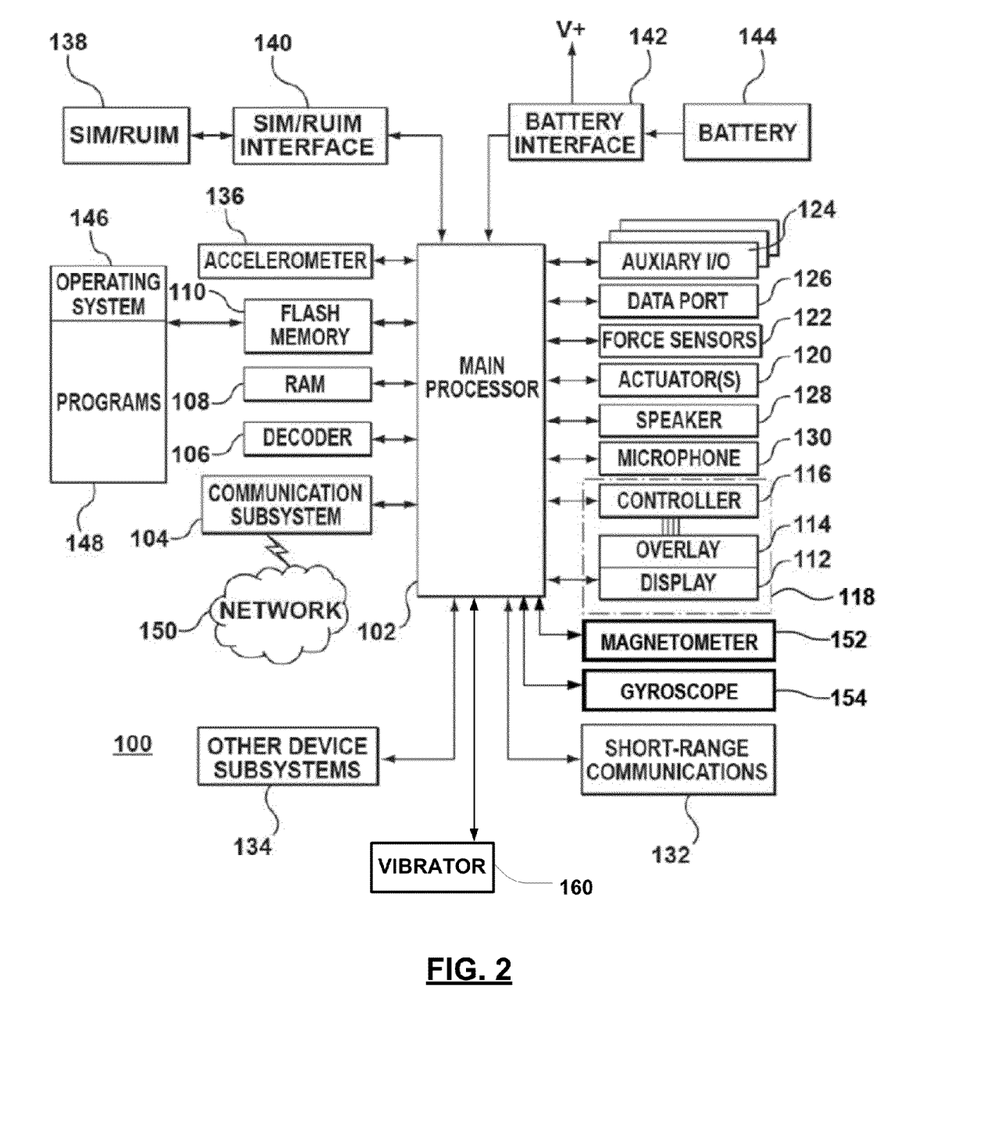
FIG. 2 is a schematic diagram of the functional components of an electronic device according to one embodiment.

The electronic device 12 may include any suitable electronic device, such as a portable smart phone having a display 13, and may include a memory, a processor, a communications system for communicating over a wireless network (e.g., a cellular network), a vibrator, a microphone and other functional components as will be generally understood (e.g., one or more of the functional components as shown in FIG. 2).

In some embodiments, the electronic device 12 may have a physical keyboard 15. In some embodiments, the electronic device 12 may include a touchscreen device, optionally with or without the keyboard 15. These and various other components of the electronic device 12 may be coupled (e.g., physically, electronically, optically, communicatively, mechanically or any combination thereof) to one another directly or via one or more intermediate components. In a typical embodiment, for example, a housing may securely hold various components and may furnish some structural integrity to the electronic device 12.

As shown, the electronic device 12 may be coupled to an audio accessory 14. In this embodiment the audio accessory 14 is a headset having speakers 16, 18 that are operable to output audio content, such as music, speech, and so on.

In this embodiment, the audio accessory 14 includes a user control interface 20 for controlling aspects of the electronic device 12 (e.g., audio volume, answering an incoming telephone call, etc.). The audio accessory 14 may also include a microphone 30 for receiving audio signals (e.g., a user's voice) and for sending those audio signals to the electronic device 12.

Turning now to FIG. 2, illustrated therein is a simplified block diagram of functional components of a portable electronic device 100 according to one embodiment (and which may be the electronic device 12 of FIG. 1, or another electronic device).

As shown, the portable electronic device 100 includes a processor 102 that controls at least some operations of the portable electronic device 100. As used herein, the processor 102 may be a single processor or multiple processors or control elements.

Communication functions, including data communications, voice communications (or both) may be performed through a communication subsystem 104. In some embodiments, data received by the portable electronic device 100 may be decompressed and decrypted by a decoder 106.

The portable electronic device 100 may have an on-board power supply. For example, the portable electronic device 100 may include a battery interface 142 for receiving one or more rechargeable or replaceable batteries 144.

The communication subsystem 104 may receive messages from, and send messages to, a wireless network 150. The wireless network 150 may be any type of wireless network, including, but not limited to, data-centric wireless networks, voice-centric wireless networks, and networks that support both voice and data communications (for example 3G or 4G networks).

The processor 102 generally interacts with subsystem components such as a Random Access Memory (RAM) 108, a flash memory 110, and a display 112 (which may have a touch-sensitive overlay 114 connected to an electronic controller 116 that together form a touch-sensitive display 118). Information, such as text, characters, symbols, images, icons, and other items may be displayed on the touch-sensitive display 118.

In some embodiments, user-interaction with the graphical user interface may be performed through the touch-sensitive overlay 114. In particular, the processor 102 may interact with the touch-sensitive overlay 114 via the electronic controller 116.

Other components could include an actuator assembly 120, one or more optional force sensors 122, an auxiliary input/output (I/O) subsystem 124, a data port 126, one or more speakers 128, a microphone 130, a short-range communications module 132 and other device subsystems 134.

In some embodiments, to identify a user as a subscriber for network access, the portable electronic device 100 may use a Subscriber Identity Module (SIM) or a Removable User Identity Module (RUIM) card 138 inserted into a SIM/RUIM interface 140 for communication with the wireless network 150. Alternatively, user identification information may be programmed into the flash memory 110, or via other techniques.

The portable electronic device 100 generally includes an operating system 146 and software components 148 that are executed by the processor 102. The operating system 146 and software components 148 may be stored in a persistent data storage device, such as the flash memory 110, or another data storage device.

In some embodiments, applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message or an e-mail message may be processed by the communication subsystem 104 and input to the processor 102. The processor 102 may then process the received signal for output to the display 112 or to the auxiliary I/O subsystem 124 (or both). In some embodiments, a user may compose data items, such as e-mail messages, which may be transmitted over the wireless network 150 through the communication subsystem 104.

For voice communications, the overall operation of the portable electronic device 100 may be similar. For example, the speaker 128 may output audible information converted from electrical signals, and the microphone 130 may convert received audible information into electrical signals for processing.

As shown, in some embodiments the processor 102 may also be electronically coupled to an accelerometer 136. The accelerometer 136 may be used for detecting the acceleration experienced by the device 100, for example by measuring the direction of gravitational forces or gravity-induced reaction forces on the device 100. In some embodiments, the accelerometer 136 generally measures weight per unit of mass, also known as specific force or G-forces (Gs), acting on the device 100.

As shown, the portable electronic device 100 may also include a magnetometer 152 or another suitable electronic compass. The electronic compass may facilitate location and direction based services, such as navigation, by sensing the position of the portable electronic device 100 in relation to one or more magnetic fields, particularly the Earth's magnetic field.

As shown, the portable electronic device 100 may include a gyroscope 154. The gyroscope 154 may be adapted to measure the rotational velocity of the portable electronic device 100 in the local frame of reference of the device 100. For example, when the device 100 is at rest, the gyroscope 154 generally indicates that the device 100 is stationary. Conversely, when the device 100 is being rotated the gyroscope 154 indicates the relative movement of the device 100 about one or more of axes. In particular, the gyroscope 154 may be a 3-axis gyroscope adapted to measure pitch, roll and yaw of the device 100.

As shown, the electronic device 100 also includes a vibrator 160. The vibrator 160 is generally operable to vibrate the electronic device 100, for example, to alert a user about one or more particular events (e.g., a new electronic message, a calendar event, a telephone call, a low battery, etc.).

In general, the vibrator 160 may be any suitable mechanical or electromechanical device capable of vibrating the electronic device 100, that is, causing repeated physical movement or oscillation of the electronic device 100 or a portion thereof. For instance, the vibrator 160 could be an electric motor with an eccentrically mounted weight that is designed to rotate at one or more rotational speeds to cause the electronic device 100 to oscillate. In other embodiments, the vibrator 160 may be a piezoelectric vibrator. In general, the vibrator 160 is physically coupled to one or more structural elements of the electronic device 100 such that vibration of the vibrator 160 results in vibration of at least part of the electronic device 100.

In some embodiments, the vibrator 160 may be adapted to vibrate at particular frequencies. For instance, the vibrator 160 may be operable to vibrate at frequencies of between 5 Hz and 200 Hz, or at higher or lower frequencies. In some embodiments, these frequencies may be subsonic frequencies (e.g., less than 20 Hz) so that the vibration of the electronic device 100 may not be audible but may simply provide a tactile response to a user. In other embodiments, the vibrator 160 may be operable to vibrate at an audible frequency (e.g., above 20 Hz but less than 20,000 Hz).

In general, the vibrator 160 operates under the direct or indirect control or direction of the processor 102. In some embodiments, as discussed above, the intensity or duration (or both) of the vibration generated by the vibrator 160 may be adjusted by the processor 102 under different circumstances, for example based on user preferences, in response to particular events, or for different device configurations (e.g., a loud configuration, a quiet configuration, etc.).

In some embodiments, one or more sensors (e.g., the microphone 130) may be used to determine when the electronic device 100 is experiencing undesirable vibration effects (i.e., is bouncing) due to interactions between the vibrating electronic device 100 and a particular surface (e.g., a hard table). For example, in some embodiments the microphone 130 may detect one or more audible higher-order harmonic frequencies that are indicative that the electronic device 100 is bouncing.

When undesirable vibration effects are detected, the vibrator 160 can be adjusted to suppress these effects. In particular, the intensity or duration (or both) of the vibrator 160 can then be reduced to inhibit undesirable bouncing of the electronic device 100 on a surface. As will be discussed below, in some cases the frequency of the vibrator 160 may also be adjusted. "Adjusting" a factor (such as frequency or intensity or duration) may include setting the value or magnitude of the factor, changing the value or magnitude of the factor, or controlling a constraint on the value or magnitude of the factor.

Qualitatively, the bouncing of an electronic device can be categorized based on the perceptions of an ordinary user. For instance, various observed frequency spectra as seen by the microphone for four vibrating states are shown in FIGS. 3 to 6, in which the fundamental frequency of vibration was around 120 Hz. These states can be qualitatively characterized as a quiet hum (FIG. 3), a noticeable hum (FIG. 4), an onset of a buzzing noise (FIG. 5), and a loud buzzing noise (FIG. 6). Note that the microphone used to generate these graphs was not calibrated.

In general, as will be observed by inspection of these figures, the frequency spectrum changes rather abruptly when buzzing occurs, and significant higher-order harmonic components are observed.

It has also been determined that variations of the fundamental frequency itself are generally not a good indicator of whether the electronic device is experiencing undesired vibration effects. Indeed, the fundamental frequency can often vary, for example if a user holds the electronic device tightly in their hand, without the presence of undesirable vibration effects. Thus, it is the presence of higher-order harmonics above the fundamental of first harmonic, and their relative magnitudes, which serves as a good indicator that the electronic device is experiencing undesired vibration effects.

Figure 3:
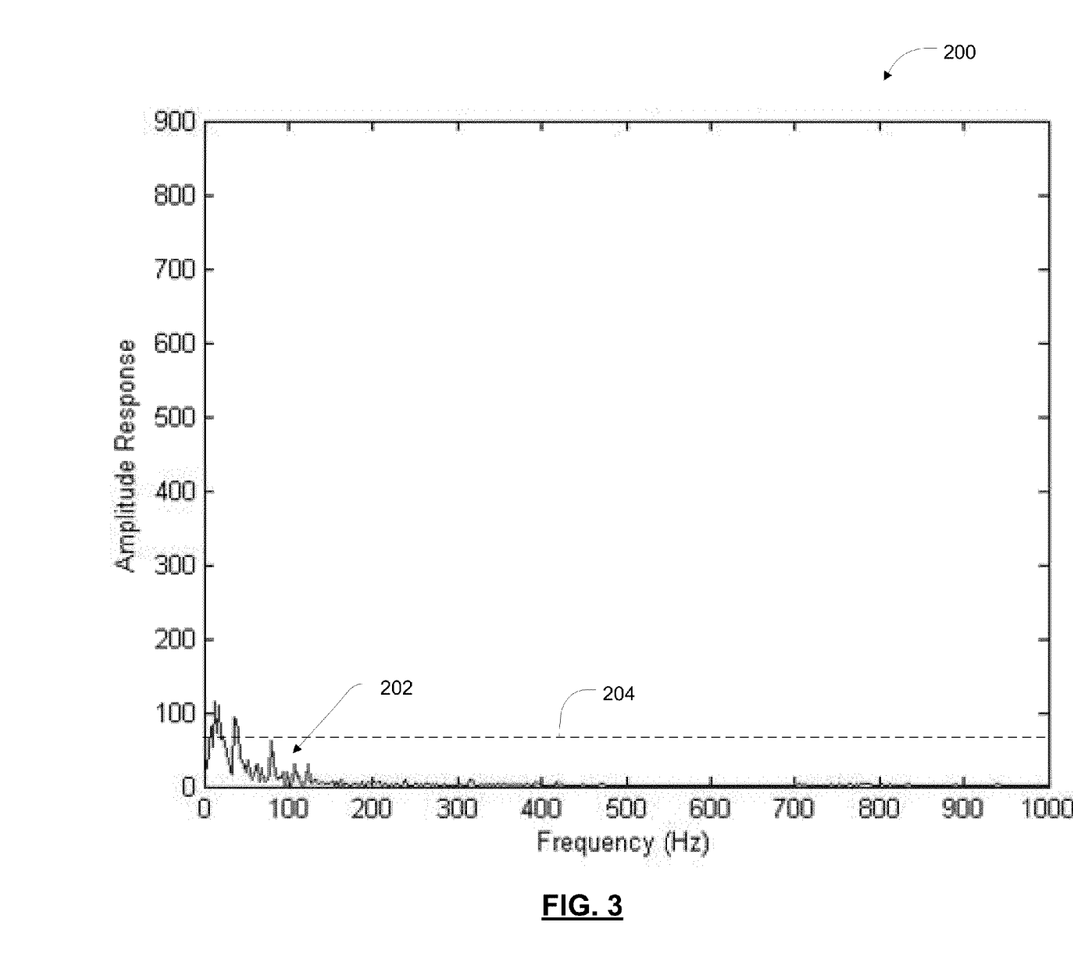
FIG. 3 is a schematic diagram of an observed microphone signal for an electronic device vibrating in a first state.

As shown in FIG. 3, in a quiet hum state 200, the observed frequency spectra 202 is generally of low amplitudes and frequencies. In particular, the only significant peaks in these frequency spectra 202 are around 10 Hz and 20 Hz, and which are generally due to noise that is caused by the electronic device, the vibrator and other extraneous noises picked up by the microphone.

As also shown in FIG. 3, a threshold amplitude 204 may be defined. The threshold amplitude 204 may be selected as a cut-off amplitude below which higher-order harmonic peaks may be ignored and the vibration of the vibrating element (e.g., the vibrator 160) will generally be left undisturbed.

More particularly, higher-order harmonic peaks (e.g., second order harmonics, third order harmonics, etc.) below the threshold amplitude 204 may not be sufficiently disruptive to the user experience to warrant interfering with the operation of the vibrator 160.

For example, in the quiet hum state 200, the observed frequency spectra 202 are mostly at or below the threshold amplitude 204 and no significant higher-order harmonics are observed. Thus, while a user may perceive a slight humming sound in this state 200, this level of noise would normally not be too distracting and would normally not warrant making changes to the operation of the vibrator.

Figure 4:
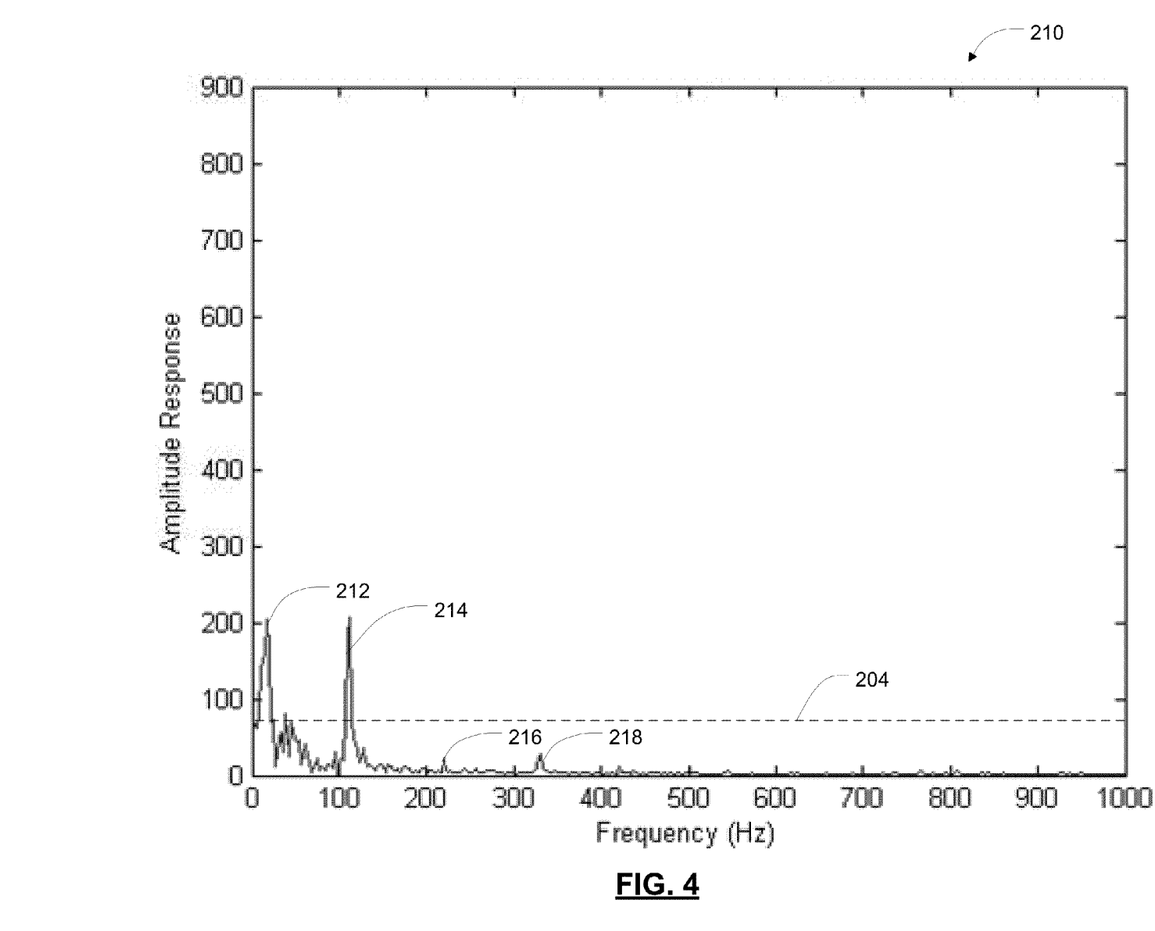
FIG. 4 is a schematic diagram of an observed microphone signal for an electronic device vibrating in a second state.

Turning now to FIG. 4, when the electronic device is in a noticeable hum state 210, a significant portion of the observed frequency spectra is still below the threshold amplitude 204. Two distinct peaks 212, 214 are observed that do exceed the threshold amplitude 204, including a low-frequency peak 212 at around 10 Hz (which will be inaudible) and a fundamental peak 214 (i.e. a peak at the fundamental frequency) generally at around 110 Hz.

Several smaller higher-order harmonics are also present, for example a second order harmonic 216 at around 220 Hz, and a third order harmonic 218 at around 330 Hz. The presence of these higher-order harmonics 216, 218 confirms that the peak 214 is indeed the fundamental peak. However, the amplitude of these higher-order harmonics 216, 218 is not particularly significant, and none exceed the threshold amplitude 204.

Thus, although the user may notice some humming, the level of noise in this state 210 would not normally be sufficiently disruptive to warrant adjusting the operation of the vibrator.

Figure 5:
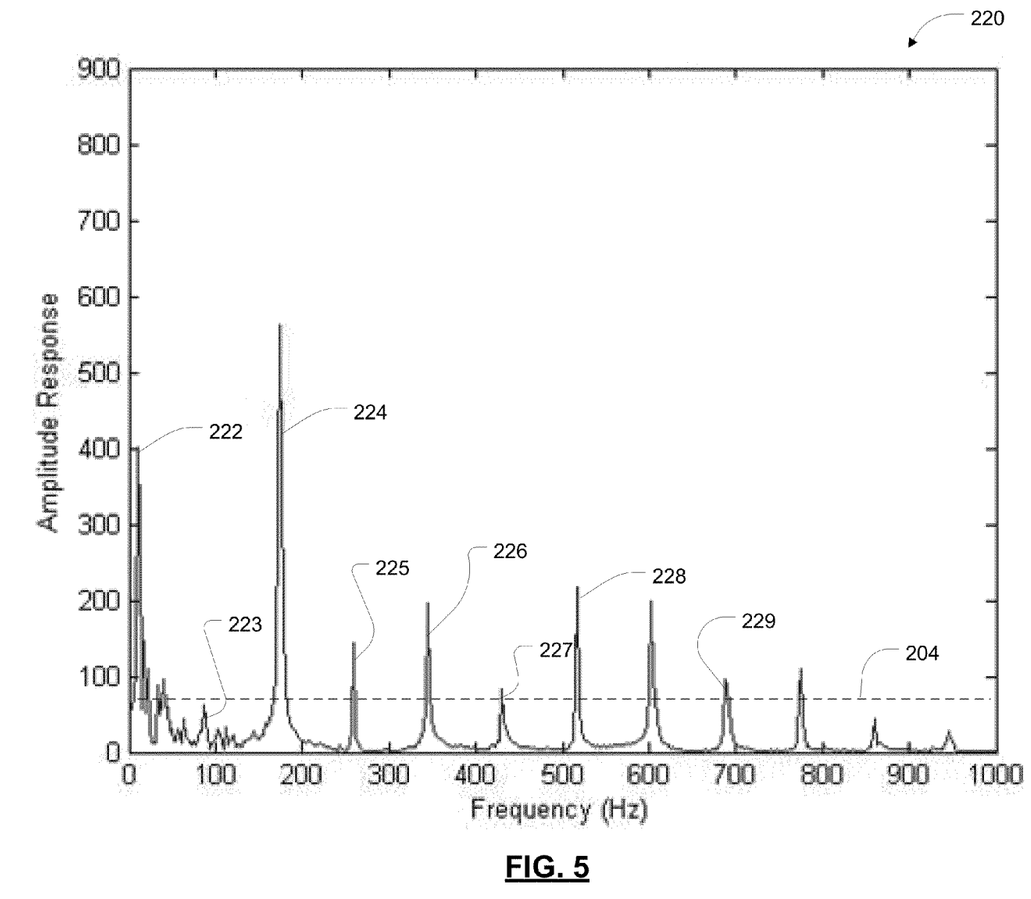
FIG. 5 is a schematic diagram of an observed microphone signal for an electronic device vibrating in a third state.
Figure 6:
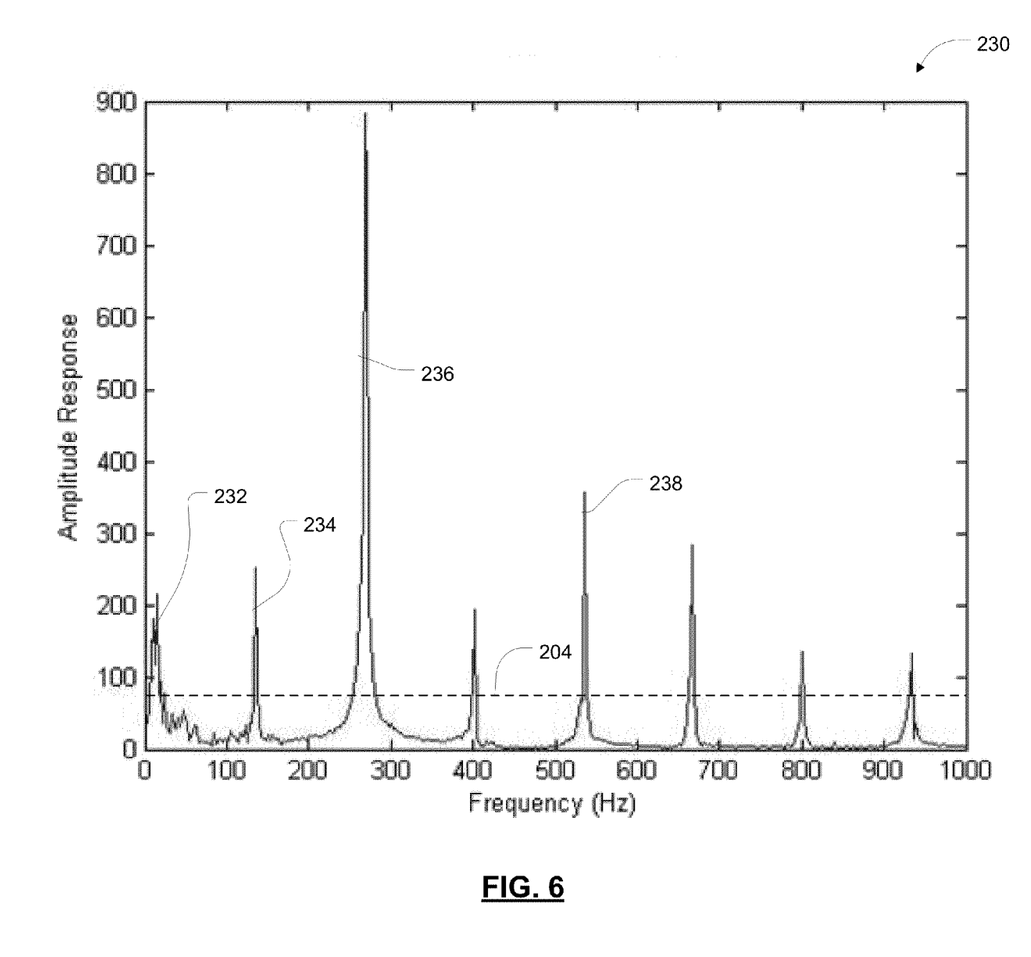
FIG. 6 is a schematic diagram of an observed microphone signal for an electronic device vibrating in a fourth state.

Turning to FIG. 5, however, the electronic device is now shown in an onset of buzz state 220. In this state 220, a user may perceive fairly distracting, unpleasant and undesirable noise, and the intensity of the vibration may cause unwanted movement of the electronic device on a surface. As evident by visual inspection, there are a number of peaks in this state 220, many of which exceed the particular threshold amplitude 204.

The first high-amplitude peak is a low-frequency peak 222 that is generally inaudible.

The next peak is actually the fundamental peak 223, which is around 90 Hz in this embodiment and which does not exceed the particular threshold 204. The frequency of the fundamental peak 223 can generally be confirmed by analyzing the spacing between the higher-order harmonics 224 to 229.

As shown in FIG. 5, a number of these higher-order harmonics have amplitudes that exceed the particular threshold 204, including a second-order harmonic peak 224 (at around 180 Hz), a third-order harmonic peak 225 (at around 270 Hz), a fourth-order harmonic peak 226 (at around 360 Hz), and so on.

These higher-order harmonics are caused by the interaction between the vibration of the electronic device and the surface, and generally correspond to unwanted audio effects and undesirable movement of the electronic device. Accordingly, when in this state 220, it may be desirable to adjust the properties of the vibrating element to suppress these noises and unwanted movement.

Turning now to FIG. 6, in this diagram the electronic device is in a loud buzz state 230. In this state 230, the user may readily perceive that the undesirable buzzing noise is quite loud, and the electronic device may experience significant movement relative to the surface.

As shown in this figure, an inaudible low-frequency peak 232 and a fundamental peak 234 (in this case at around 130 Hz) are present, in addition to a number of higher-order harmonics that are even stronger as compared with the higher-order harmonics of FIG. 5.

Some of these higher-order harmonics may be many times stronger than the particular threshold 204, making them relatively easy to detect. For example, as shown in FIG. 6 a second-order harmonic peak 236 at around 260 Hz is more than ten times as strong as the particular threshold 204.

Similarly, another higher-order harmonic peak 238 at around 520 Hz has an amplitude that is around four times stronger than the particular threshold 204.

In general, when higher-order harmonics such as those of FIG. 5 or FIG. 6 are observed (e.g., as detected by the microphone 130 or by another sensor, such as an accelerometer 136), the vibration of the electronic device 100 can be adjusted so as to try and eliminate or at least suppress these effects and avoid or at least inhibit unwanted noise and movement. For example, the intensity or the frequency of the vibrator 160 (or both) can be reduced to try and lessen or eliminate the high-amplitude higher-order harmonic peaks.

In some embodiments where the vibrating element is a DC motor having an eccentric weight, the motor's only input may be an applied DC voltage. In some such cases, the electronic device can pulse this DC voltage (i.e. repeatedly turning the voltage on and off) to give short bursts of rotation, or change the value of the DC voltage to change the motor speed and thus change the frequency of the vibration of the electronic device. In some embodiments, a time varying voltage may be applied to the vibrating element to change the frequency of vibration.

Figure 7:
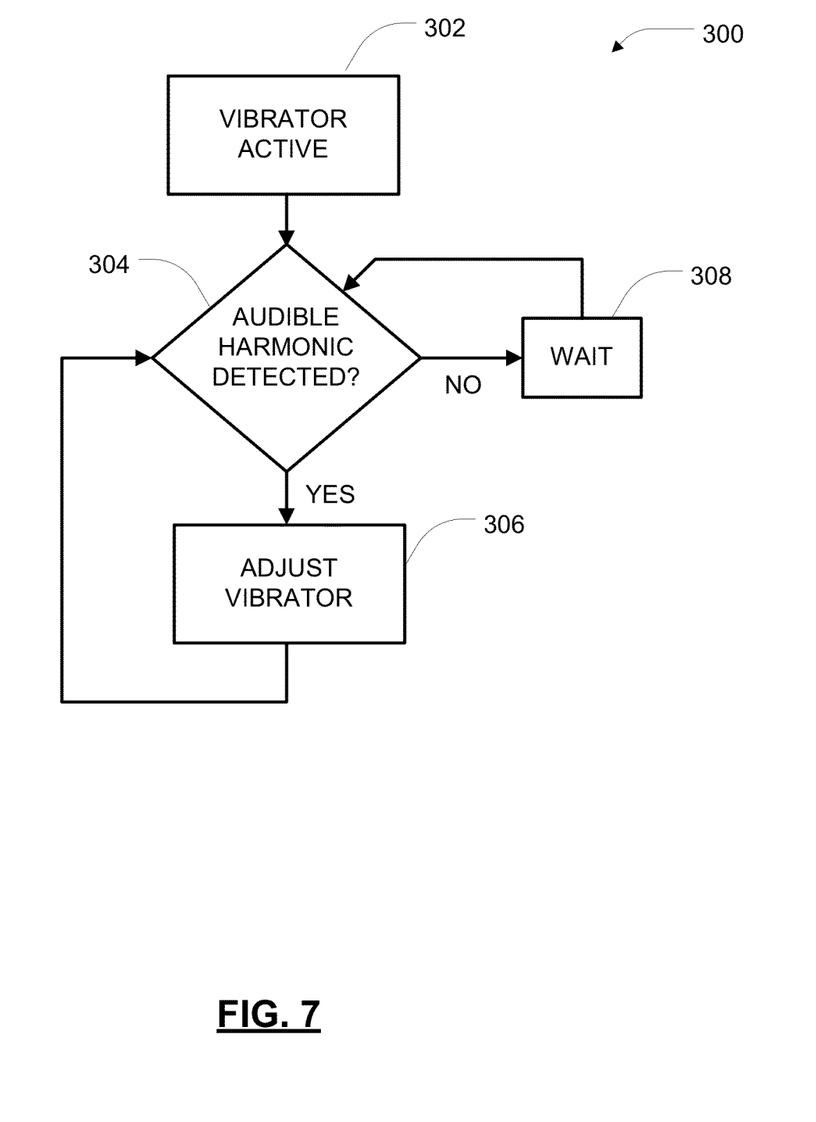
FIG. 7 is a diagram of a method of mitigating undesired vibration effects according to one embodiment.

Turning now to FIG. 7, illustrated therein is a method 300 of mitigating vibration in an electronic device according to one embodiment.

At step 302, the vibrator is active. For example, the vibrator 160 may have been activated by the processor 102 in response to a received electronic message, an incoming telephone call on the electronic device 100, and so on. Generally speaking, when the vibrator 160 is active, the vibrator 160 is moving or oscillating in response to commands or signals from the processor 102, or is otherwise controlled by the processor 102.

At step 304, one or more sensors detect the presence of an audible higher-order harmonic signal. For example, a microphone (e.g., the microphone 130) may detect a higher-order harmonic that is some integer multiple of a fundamental frequency of vibration for the vibrator 160. For instance, if the fundamental frequency is around 120 Hz, then a higher-order harmonic at around 240 Hz or 360 Hz or 480 Hz may be detected.

A particular higher-order harmonic may be defined as being an audible higher-order harmonic when the amplitude of that higher-order harmonic exceeds some particular audibility threshold (e.g., the threshold 204 shown in FIGS. 3 to 6). As discussed above, this particular threshold 204 can be selected based on the ability of an ordinary human user to perceive the higher-order harmonic as undesirable noise (e.g., a buzzing sound). In some embodiments, the threshold could be set at some particular sound level, such as −20 dBPa, 0 dBPa, +20 dBPa, and so on.

At step 306, if an audible higher-order harmonic was detected at step 304, then the vibrator can be automatically adjusted to suppress or even eliminate the audible higher-order harmonic peaks. For instance, the intensity or duration (or both) of the vibrator 160 may be reduced to try and eliminate the audible higher-order harmonics and thus reduce the buzzing and undesired movement of the electronic device.

The method 300 may then return back to step 304 where an inspection can be made to see if any audible higher-order harmonics are still detected. This loop can be repeated and continue until an audible higher-order harmonic is no longer detected.

On the other hand, if no audible higher-order harmonic was detected at step 304, then in some embodiments at step 308 the electronic device may wait a particular period of time (e.g., 50 milliseconds, 100 milliseconds, etc.) before trying to detect another audible higher-order harmonic by repeating the method 300.

In some embodiments, in the event that the microphone detects other loud sounds (e.g., due to ambient noise), some signal processing can be used (e.g., spectrum averaging) to extract the vibration harmonics from the observed signal.

However, when buzzing is present the observed higher-order harmonics will normally be quite loud. If extraneous ambient noise is interfering with the detection of such higher-order harmonics, then it is likely that the ambient environment is sufficiently noisy such that buzzing of the electronic device may not be too noticeable (although unwanted movement of the electronic device may still be a problem).

The teachings herein may provide one or more benefits as compared to known approaches to mitigating undesirable vibrating effects.

For instance, the teachings herein may generally be applied on an as needed basis when the device is in a vibrating state. Thus, when the device is not vibrating, no processing need be done. This may save power and processing resources as compared with prior systems that attempt to adjust vibrator intensity based on a prediction about the current state (or future state) of the electronic device that is made before vibration begins.

Furthermore, since the teachings herein react to the observed signals, there is no need for the electronic device to distinguish between different materials that it may be in contact with. More particularly, if the electronic device has been placed on a surface with a high damping rate (e.g., a pillow) then it is likely that little or no audible higher-order harmonics will be detected, and thus in many cases it may be that no changes need be made to the operation of the vibrating element.

On the other hand, when the electronic device is resting on a hard surface with little to no damping, significant higher-order harmonics may occur. However, the electronic device need not know anything about the surface it is in contact. Thus, the vibrating element can be left in a particular state until undesirable vibration effects are observed, and then the vibrating element can be automatically adjusted to suppress those effects.

In addition, the teachings herein are not restricted to electronic devices of any particular size, weight or shape. Rather, the teachings may be adapted to a variety of electronic devices, although they may be especially useful for handheld devices that may find their ways onto a variety of surfaces. In addition, the physical components used to carry out the processes described herein are generally small and lightweight. Many portable electronic devices, such as some kinds of small computers and smart phones, may include a vibrator, microphone and processor, and in some cases implementing the concepts on such devices may be accomplished by programming the processor and without a need for any new hardware.

The foregoing aspects of the systems, methods and electronic devices are provided for exemplary purposes only. Those skilled in the art will recognize that various changes may be made thereto without departing from the scope of the methods and the electronic devices as defined by the appended claims.

The invention claimed is:

1. An electronic device, comprising:
   a vibrator adapted to vibrate the electronic device;
   at least one microphone adapted to detect at least one audible higher-order harmonic that exceeds a particular threshold amplitude associated with an audibility of the higher-order harmonic when the vibrator is active, the at least one audible higher-order harmonic being indicative of an undesirable vibration effect; and
   a processor adapted to adjust at least one of the frequency and intensity of the vibrator to reduce the at least one detected audible higher-order harmonic below the threshold amplitude.

2. The electronic device of claim 1, wherein the vibrator is a DC motor and the processor is operable to adjust the voltage applied to the DC motor to reduce the at least one audible higher-order harmonic.

3. The electronic device of claim 2, wherein the adjustment to the voltage includes pulsing the voltage.

4. A method for mitigating vibration effects in an electronic device, comprising:
   activating a vibrating element on the electronic device according to a fundamental frequency;
   detecting the presence of at least one audible higher-order harmonic based on the fundamental frequency; and if an audible higher-order harmonic is detected, then adjusting the vibrating element to suppress the audible higher-order harmonic.

5. The method of claim 4, wherein the method includes repeatedly detecting the at least one audible higher-order harmonic and adjusting the vibrating element until the at least one audible higher-order harmonic is eliminated.

6. The method of claim 4, wherein the fundamental frequency is decreased to reduce the at least one audible higher-order harmonic.

7. The method of claim 4, wherein the intensity of the vibrating element is decreased to reduce the at least one audible higher-order harmonic.

8. The method of claim 4, wherein a harmonic is an audible higher-order harmonic if it exceeds a particular threshold amplitude associated with the audibility of the higher-order harmonic to a user.

9. The method of claim 4, wherein the at least one audible higher-order harmonic is detected using at least one sensor.

10. The method of claim 9, wherein the at least one sensor includes a microphone.

11. The method of claim 9, wherein the at least one sensor includes an accelerometer.

12. The method of claim 4, further comprising, if no audible higher-order harmonic is detected, then waiting a particular period of time and then repeating the method.

13. An electronic device, comprising:
a vibrating element adapted to vibrate the electronic device according to a fundamental frequency; and
at least one sensor operable to detect at least one audible higher-order harmonic when the vibrating element is active;
wherein the at least one audible higher-order harmonic is an integer multiple of the fundamental frequency, and
wherein the electronic device is operable to adjust the vibrating element to reduce the at least one audible higher-order harmonic when detected.

14. The electronic device of claim 13, wherein the processor is adapted to repeatedly adjust the vibrating element until the at least one audible higher-order harmonic is eliminated.

15. The electronic device of claim 13, wherein the processor is adapted to decrease the fundamental frequency to reduce the at least one audible higher-order harmonic.

16. The electronic device of claim 13, wherein the processor is adapted to decrease the intensity of the vibrating element to reduce the at least one audible higher-order harmonic.

17. The electronic device of claim 13, wherein the processor is adapted to determine that a harmonic is an audible higher-order harmonic if it exceeds a particular threshold amplitude associated with the audibility of the higher-order harmonic to a user.

18. The electronic device of claim 13, wherein the at least one sensor includes a microphone.

19. The electronic device of claim 13, wherein the at least one sensor includes an accelerometer.

20. The electronic device of claim 13, wherein the processor is further adapted to wait a particular period of time if no audible higher-order harmonic is detected, and then repeat the detection.

* * * * *